(12) United States Patent
Iino et al.

(10) Patent No.: US 6,717,330 B2
(45) Date of Patent: Apr. 6, 2004

(54) ULTRASONIC MOTOR AND ELECTRONIC DEVICE HAVING THE ULTRASONIC MOTOR

(75) Inventors: Akihiro Iino, Chiba (JP); Kouji Nitadori, Chiba (JP); Masao Kasuga, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/187,570

(22) Filed: Jul. 2, 2002

(65) Prior Publication Data

US 2003/0020368 A1 Jan. 30, 2003

(30) Foreign Application Priority Data

Jul. 3, 2001 (JP) ........................................ 2001-202210

(51) Int. Cl.⁷ ............................................. H02N 2/00
(52) U.S. Cl. ..................................................... 310/317
(58) Field of Search ........................ 310/316.01, 316.02, 310/317

(56) References Cited

U.S. PATENT DOCUMENTS

| | | | | |
|---|---|---|---|---|
| 5,714,831 A | * | 2/1998 | Walker et al. | 310/316.01 |
| 5,907,212 A | * | 5/1999 | Okada | 310/328 |
| 5,939,851 A | * | 8/1999 | Kataoka et al. | 318/611 |
| 6,433,459 B1 | * | 8/2002 | Okada | 310/317 |

\* cited by examiner

Primary Examiner—Thomas M. Dougherty
(74) Attorney, Agent, or Firm—Adams & Wilks

(57) ABSTRACT

A control portion always monitors a present-position signal from a position sensor and monitors whether the present position of a moving body is a desired position, or not (Step 101). In the case where the control portion detects that the present position of the moving body reaches the desired position, the control portion generates a stop command signal and gives the stop command signal to an oscillation drive circuit (S102). Then, the control portion checks whether overshooting occurs, or not (S103), and in the case where the control portion judges that overshooting occurs, the control portion retains a stop command signal as it is for a stop command retaining time t (S104). After the stop command retaining time t elapses, the control portion gives a reverse command signal to the oscillation drive circuit to conduct reverse operation (S105). After Step S105, the control is returned to Step S101 and the above operation is repeated. Then, in the case where the control portion judges that overshooting does not occur in Step S103, position correcting operation is completed.

9 Claims, 10 Drawing Sheets

STATE DIAGRAM IN THE CASE WHERE OVERSHOOTING OCCURS DURING CLOCKWISE ROTATION

| | DURING CLOCKWISE DIRECTION | DURING STOP COMMAND RETAINING | DURING COUNTERCLOCKWISE DIRECTION |
|---|---|---|---|
| INVERTER 11 (CONTROL SIGNAL) | ABL (ON) | DABL (OFF) | ABL (ON) |
| BUFFER 12a (CONTROL SIGNAL) | ABL (ON) | ABL → DABL (ON) → (OFF) | DABL (OFF) |
| BUFFER 12b (CONTROL SIGNAL) | DABL (OFF) | DABL → ABL (OFF) → (ON) | ABL (ON) |

ABL: ENABLE   DABL: DISENABLE

FIG. 5A

STATE DIAGRAM IN THE CASE WHERE OVERSHOOTING OCCURS DURING CONTERCLOCKWISE ROTATION

| | DURING CLOCKWISE DIRECTION | DURING STOP COMMAND RETAINING | DURING COUNTERCLOCKWISE DIRECTION |
|---|---|---|---|
| INVERTER 11 (CONTROL SIGNAL) | ABL (ON) | DABL (OFF) | ABL (ON) |
| BUFFER 12a (CONTROL SIGNAL) | DABL (OFF) | DABL → ABL (OFF) → (ON) | ABL (ON) |
| BUFFER 12b (CONTROL SIGNAL) | ABL (ON) | ABL → DABL (ON) → (OFF) | DABL (OFF) |

ABL: ENABLE   DABL: DISENABLE

FIG. 5B

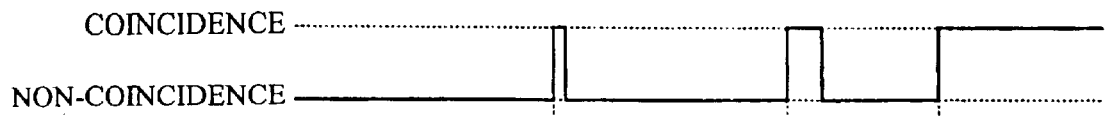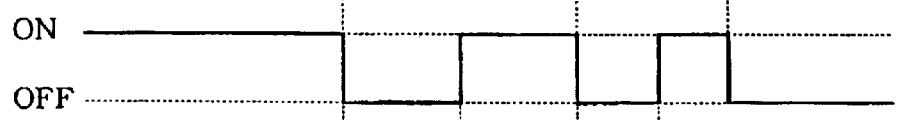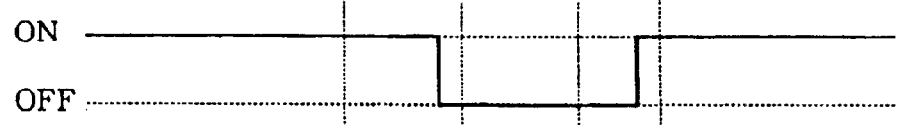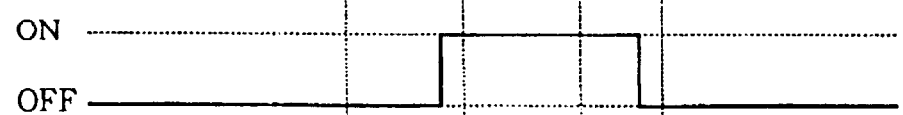
FIG. 6

ULTRASONIC MOTOR AND ELECTRONIC DEVICE HAVING THE ULTRASONIC MOTOR

BACKGROUND OF THE INVENTION

1. Field of the Invention

The present invention relates to an ultrasonic motor and an electronic device having the ultrasonic motor, and more particularly to a positioning control of the ultrasonic motor.

2. Description of the Related Art

The ultrasonic motor is made up of: a vibrator which is attached with a piezoelectric body; a moving body; a pressurizing means that brings the moving body into a pressure contact with the vibrator; an electrode that applies a high frequency voltage to the piezoelectric body; and an oscillation driving circuit that generates the high frequency voltage, and frictionally drives the moving body by vibration waves that are generated in the vibrator due to the expansion/contraction motion of the piezoelectric body.

The ultrasonic motor has various characteristics such that the motor has a high torque at a low speed; has a large retaining torque in a non-energization state; is high in response and controllability; has no magnetic operation; is capable of being downsized and lightened in weight; and has extremely small operating sound. Therefore, the ultrasonic motor is available as a drive source of the positioning means of various electronic devices. For example, the ultrasonic motor can be used for driving, for example, an indicator device that controls the movement of a given angle, an angle control of the mirror, the driving of a pickup (head) of an information device, and so on.

Incidentally, the positioning of the ultrasonic motor is conducted by a control portion where a desired position is set and a positioning sensor that detects the present position of the moving body that is driven by the vibrator of the ultrasonic motor. In the case where the moving body is a rotor, the position sensor is made up of an encoder that is attached to the rotor. As shown in FIG. 4, the control portion always monitors a present-position signal from the position sensor and monitors whether the present position of the vibrator is the desired position, or not (201). In the case of detecting that the present position of the moving body reaches the desired position, the control portion checks whether overshooting occurs, or not (202). If the control portion judges that overshooting occurs, the control portion immediately reverses the driving of the ultrasonic motor (203). Also, if the control portion judges that overshooting does not occur, that is, if the control portion judges that the moving body comes to a stabilized state in which the moving body retains the desired position, the position correcting operation is completed.

As described above, in the conventional positioning control of the ultrasonic motor, the operation is immediately shifted to the reverse operation if overshooting occurs after the moving body has reached the desired value. The overshooting is an unavoidable phenomenon in the positioning control. Therefore, the reverse operation is repeatedly conducted. The amount of overshooting gradually decreases and finally converges on zero. That is, the ultrasonic motor becomes in a stabilized state. It is desirable that a period of time since the moving body first reaches the desired position until it becomes in the stabilized state, that is, a stabilization time is shorter. However, in the conventional positioning control of the ultrasonic motor which immediately shifts to the reverse operation for position correction, the stabilization time cannot be shortened, and therefore there arises such a problem that the positioning resolution is low.

A problem to be solved is to enhance the positioning resolution by shortening the stabilization time in the positioning control of the ultrasonic motor.

SUMMARY OF THE INVENTION

In order to solve the above-mentioned problem, according to the present invention, there is provided an ultrasonic motor comprising:

a vibrator to which a piezoelectric body is attached;

a moving body that is arranged so as to rotate clockwise or counterclockwise due to the vibration of the vibrator;

a pressurizing means that brings the moving body in pressure contact with the vibrator;

an electrode that applies a high frequency voltage to the piezoelectric body;

an oscillation drive circuit that generates the high frequency voltage;

a position sensor that generates a position signal of the moving body; and a control portion that gives a command signal to the oscillation drive circuit and controls the supply of the high frequency voltage to the piezoelectric body to start/stop and rotate forward or backward the motor, in which feedback control is performed by the control portion so that the position of the moving body reaches a desired position while the position signal is compared with the desired position that is inputted in advance, and the ultrasonic motor is characterized in that reverse operation is conducted after a stop command retaining time has elapsed since an instant of overshooting.

The stop command retaining time is set in the control portion in advance and is a time interval which is from a time since the control portion detects that the moving body reaches the desired position and issues a stop command until a time the control portion issues a start command.

The stop command retaining time is set in various ways in accordance with the state of the position control.

Therefore, the stop command retaining time is set to be substantially the same as a time interval which is from the time the control portion detects that the moving body reaches the desired position and issues a stop command until a time the moving body stops. Further, the stop command retaining time is set to be substantially the same as a time interval which is from the time the control portion detects that the moving body reaches the desired position and issues a stop command until a time the vibration of the vibrator stops. Furthermore, when the oscillation drive circuit constitutes a self-excitation oscillating circuit, the stop command retaining time is set to be the same as or longer than a time interval which is from the time the control portion detects that the moving body reaches the desired position and issues a stop command until a time the self-excitation oscillation of the self-excitation oscillating circuit stops.

The stop command retaining time may include a plurality of stop command retaining times that are different in time interval.

The stop command retaining time is set to be shorter in time interval as the amount of movement of the moving body to the desired position is smaller.

The stop command retaining time is set to be shorter as the speed of the moving body immediately before the control portion issues the stop command is slower.

Further, in an electronic device including an ultrasonic motor for solving the above-mentioned problem, the ultrasonic motor is constituted as described on the above.

BRIEF DESCRIPTION OF THE DRAWINGS

These and other objects and advantages of this invention will become more fully apparent from the following detailed description taken with the accompanying drawings in which:

FIGS. 5A and 5B are diagrams showing the states of a start/stop inverter used in the ultrasonic motor shown in FIG. 1 and a pair of buffers for clockwise rotation and counterclockwise rotation, respectively;

FIG. 6 timing charts showing various signal waveforms that are generated in a control portion used in the ultrasonic motor shown in FIG. 1; and FIGS. 7A to 7C are graphs showing the characteristic curves of overshooting and a stabilization time when conducting the position correction of the ultrasonic motor, in which FIGS. 7A and 7B are characteristic curves of the ultrasonic motor in accordance with the present invention, and FIG. 7C is a characteristic curve of the conventional ultrasonic motor.

DETAILED DESCRIPTION OF THE PREFERRED EMBODIMENTS

Figure 1:
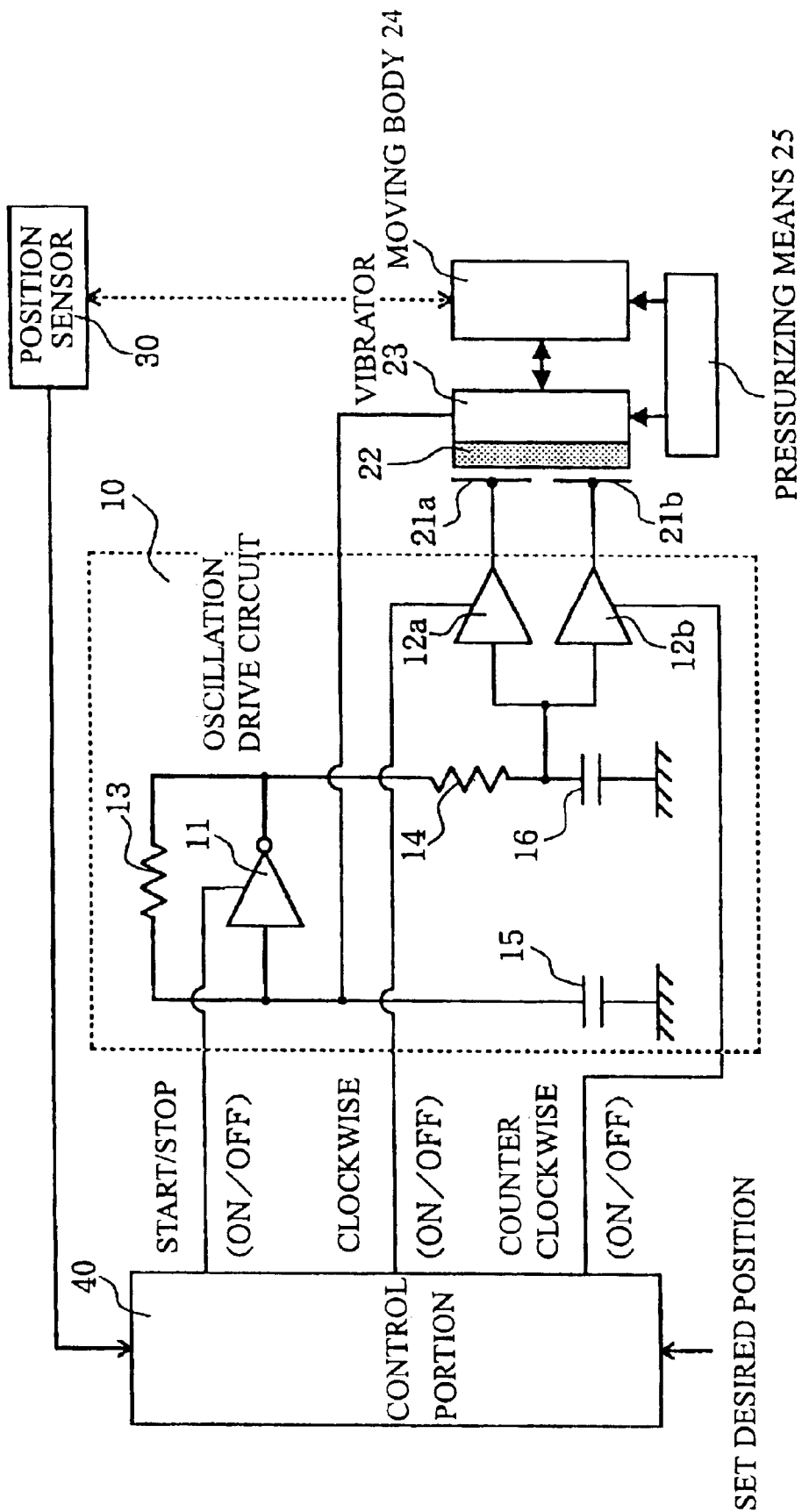
FIG. 1 is a block circuit diagram showing an ultrasonic motor in accordance with an embodiment of the present invention.

FIG. 1 is a block diagram showing an ultrasonic motor in accordance with an embodiment of the present invention. That is, the ultrasonic motor shown in FIG. 1 includes a vibrator 23 which is attached with a piezoelectric body 22, a moving body 24 which is arranged so as to rotate clockwise or counterclockwise due to the vibration of the vibrator 23, a pressurizing means 25 that brings the moving body 24 in pressure contact with the vibrator 23, a pair of electrodes 21a and 21b which apply a high frequency voltage to the piezoelectric body 22, and an oscillation drive circuit 10 that generates the high frequency voltage. The electrode 21a is for clockwise rotation and the electrode 21b is for counterclockwise rotation.

The oscillation drive circuit 10 includes resistors 13 and 14, and capacitors 15 and 16. In addition, the oscillation drive circuit 10 includes a start/stop inverter 11, a clockwise rotation buffer 12a and a counterclockwise rotation buffer 12b. The oscillation drive circuit shown in FIG. 1 constitutes a self-excitation oscillating circuit of the Colpitts vibrator by the above-mentioned circuit elements and the piezoelectric body 22 that functions as the vibrator. The self-excitation oscillating circuit is disclosed in detail in the article "development of a micro ultrasonic motor using a self-excitation driving" disclosed in a precision engineering institution journal (vol. 64, No. 8, pp. 1117 to 1121).

The position sensor 30 is formed of, for example, an encoder which always detects the present position of the moving body 24 and gives an output signal thereof to the control portion 40. In the control portion 40, the desired position of the moving body 24 is set in advance by an input means (not shown). Alternatively, the desired position of the moving body 24 is always inputted to the control portion 40 from an external device (not shown). The control portion 40 compares the desired position thus inputted with the present position from the position sensor and conducts feedback control so that the present position of the moving body 24 always coincide with the desired position.

The above-mentioned feedback control is conducted by giving a control command signal to the oscillation drive circuit 10 from the control portion 40. The control command signals include a start command or stop command signal, a clockwise rotation command signal and a counterclockwise rotation command signal, and these signals are given to the start/stop inverter 11, the clockwise rotation buffer 12a and the counterclockwise rotation buffer 12b, respectively. The control command signal is an on/off signal.

Each of the start/stop inverter 11, the clockwise rotation buffer 12a, and the counterclockwise rotation buffer 12b has a control terminal in addition to an input terminal and an output terminal and is component of a circuit such as an IC having a tri state structure or a three state structure in which it is possible to output two voltages of high and low from the output terminal in accordance with the control signal that is inputted to the control terminal and to bring a state between the input terminal and the output terminal into a high impedance state.

Figure 2:
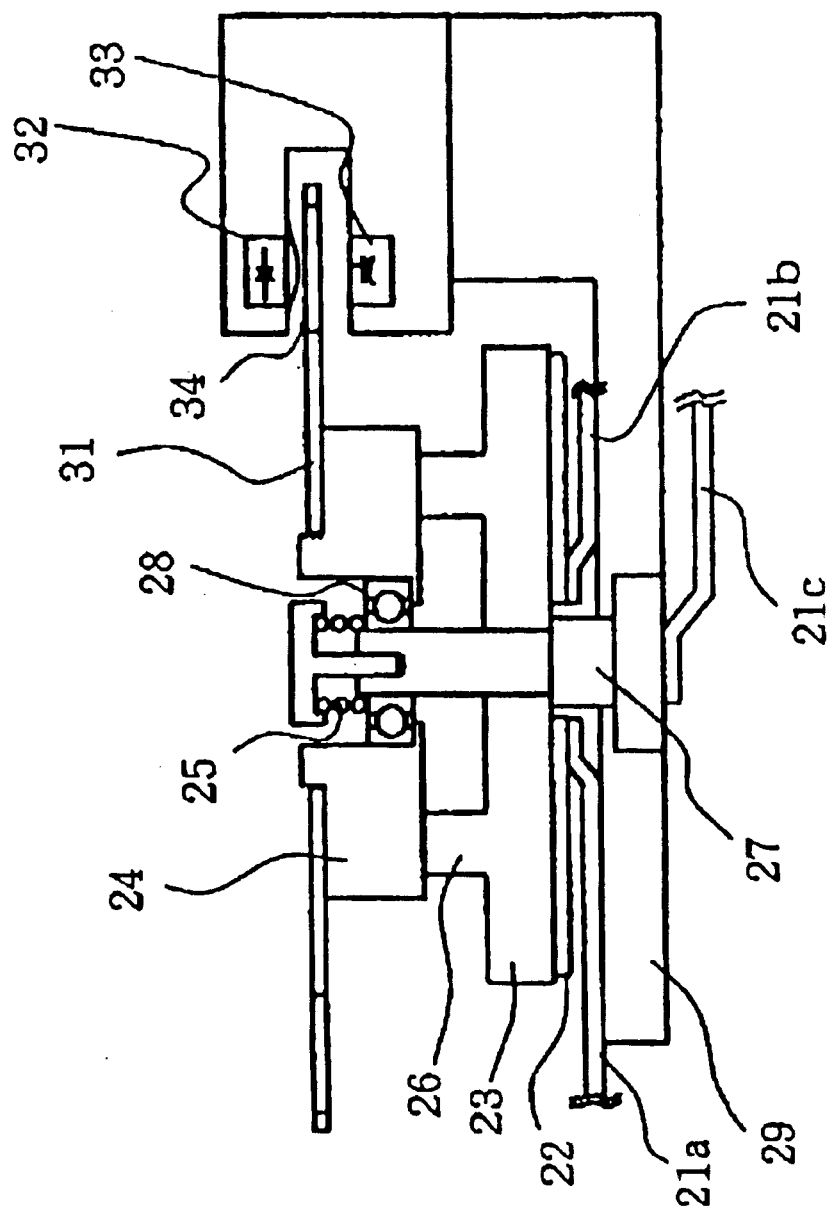
FIG. 2 is a longitudinal cross-sectional view showing a main portion of the ultrasonic motor shown in FIG. 1.

FIG. 2 is a longitudinal cross-sectional view showing a main portion of the ultrasonic motor shown in FIG. 1. In FIG. 2, the moving body 24 is a rotor which is rotatably supported to a shaft 27 through a bearing 28. The shaft 27 is erected on a motor substrate 29, and a disc-shaped vibrator 23 is coaxially fixed onto the shaft 27. A plurality of protrusions 26 are integrally formed on an upper surface of the disc-shaped vibrator 23, and the piezoelectric body 22 is attached to the lower surface of the disc-shaped vibrator 23. A pair of electrode plates which are formed in a given electrode pattern, that is, the clockwise rotation electrode 21a and the counterclockwise rotation electrode 21b are disposed on the lower surface of the piezoelectric body 22. The vibrator 23 that also functions as a common electrode plate on the upper surface side of the piezoelectric body 22 is electrically connected to the common electrode 21c through the shaft 27. A spring 25 that functions as the pressurizing means pressurizes the rotor 24 toward the vibrator 23 and brings the lower surface of the rotor 24 in pressure contact with top end surfaces of the plurality of protrusions 26.

In the ultrasonic motor thus structured, when a high frequency voltage is applied between the clockwise rotation electrode 21a or the counterclockwise rotation electrode 21b and the common electrode 21c, periodic vibrations occur in the vibrator 23 due to the expansion/contraction motion of the piezoelectric body 22. The periodic vibrations are standing waves, and the periodic vibrations of the vibrator 23 are transmitted to the rotor 24 that is brought in pressure contact with the plurality of protrusions 26 by the spring 25 as a motive force.

The rotor 24 is frictionally driven by the vibration waves that are generated by the vibrator 23 and-rotated clockwise or counterclockwise due to the action of the plurality of protrusions 26 arranged in the given electrode pattern and at the given intervals. That is, when the high frequency voltage is applied between the clockwise rotation electrode 21a and the common electrode 21c, the rotor 24 rotates clockwise, and when the high frequency voltage is applied between the counterclockwise rotation electrode 21b and the common electrode 21c, the rotor 24 rotates counterclockwise. The structure and operation of the standing wave type ultrasonic motor thus structured is disclosed in JP 11-55971 A and so on, and therefore their detailed description will be omitted.

FIG. 2 shows an embodiment of the position sensor 30. The position sensor 30 is an encoder including a disc-shaped encoder scale 31, a light-emitting element 32 and a light-receiving element 33. The disc-shaped encoder scale 31 has a large number of slits 34 formed at equal intervals in the circumferential direction. The number of slits 34 corresponds to the resolution required for positioning control. The disc-shaped encoder scale 31 is disposed so as to be attached on the upper surface of the rotor 24. The light emitting element 32 and the light receiving element 33 are located at positions where optical beams pass through the slits 34 and attached onto the motor substrate 29 with the disc-shaped encoder scale 31 interposed therebetween.

Figure 3:
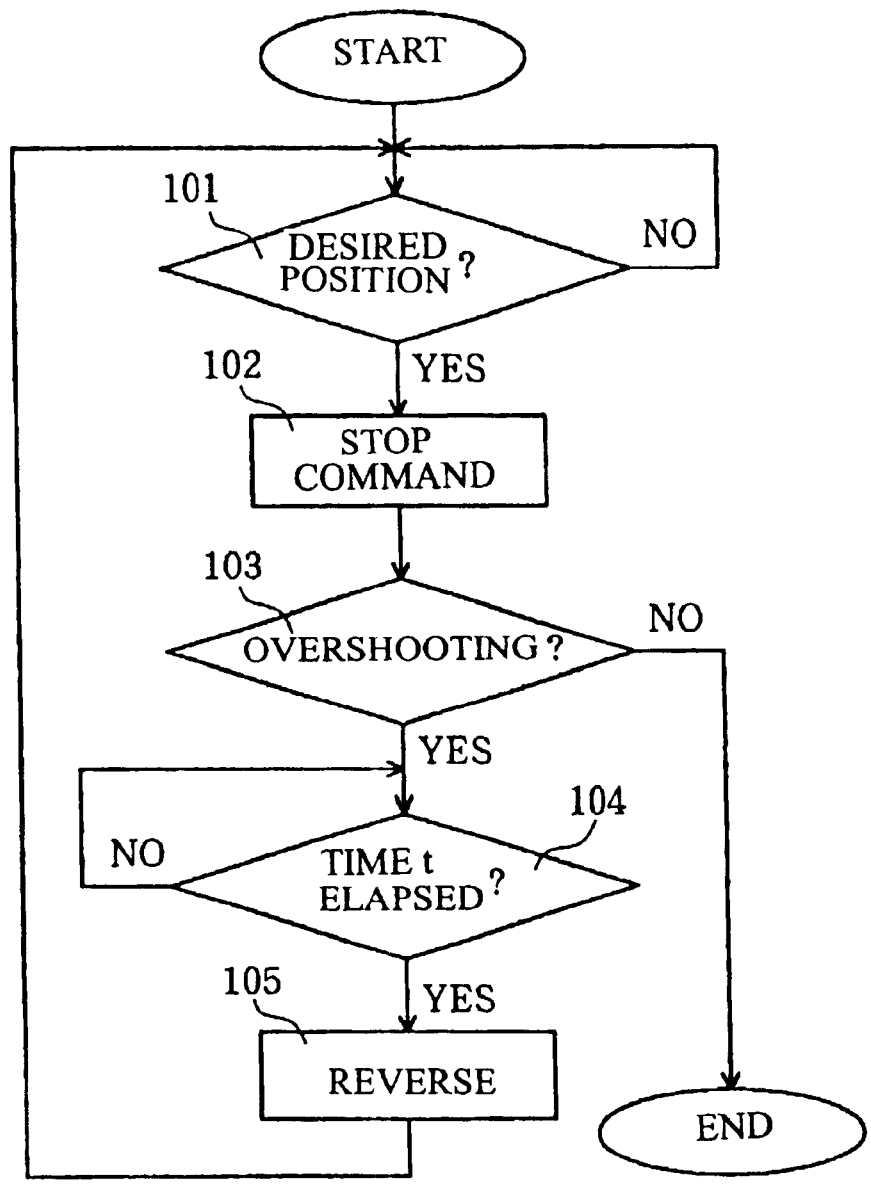
FIG. 3 is a flowchart showing an example of the operation of the ultrasonic motor in accordance with the present invention.
Figure 4:
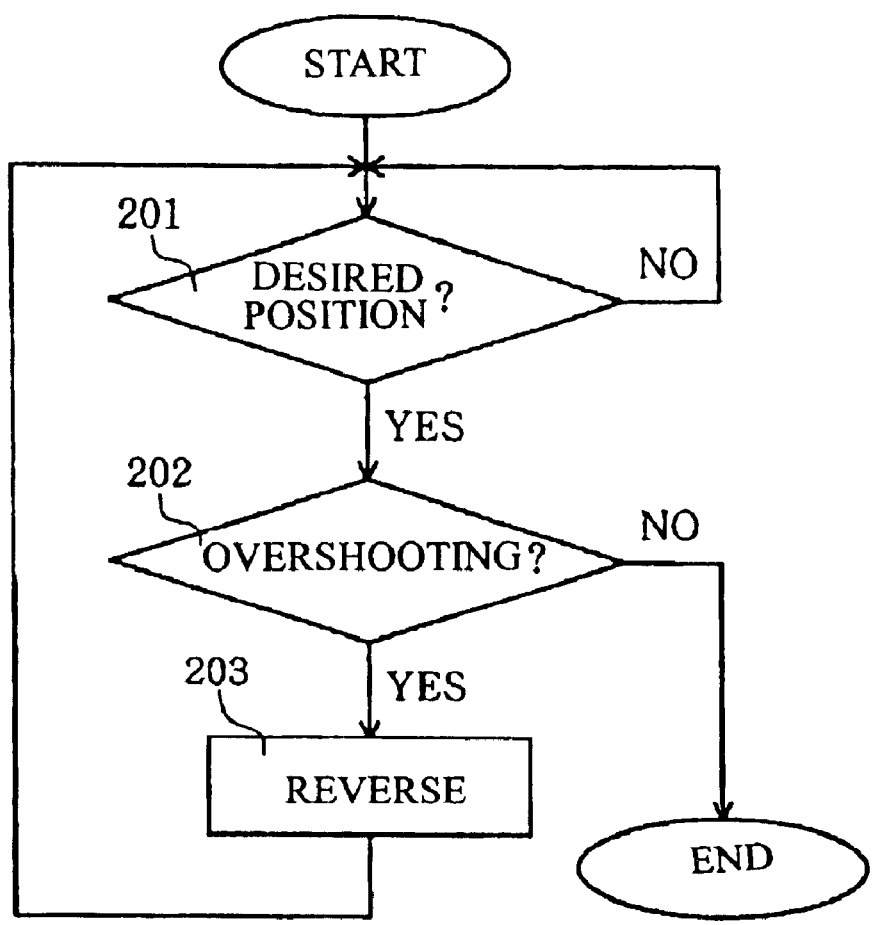
FIG. 4 is a flowchart showing the operation of a conventional ultrasonic motor.

In the ultrasonic motor structured as shown in FIGS. 1 and 2, the positioning control is conducted in accordance with a flowchart shown in FIG. 3. That is, the control portion 40 always monitors the present-position signal from the position sensor 30 and monitors whether the present position of the moving body 24 is the desired position, or not (101). In the case where the control portion 40 detects that the present position of the moving body 24 reaches the desired position, the control portion 40 generates a stop command signal (102) and gives the stop command signal to the oscillation drive circuit 10. Subsequently, the control portion 40 checks whether overshooting occurs, or not (103), and in the case where the control portion 40 judges that overshooting occurs, the control portion retains the stop command signal as it is for a stop command retaining time t (104). After the stop command retaining time t has elapsed, the control portion 40 gives a reverse command signal to the oscillation drive circuit 10 to conduct the reverse operation (105). After the step S105, the operation is returned to the step 101, and the above-mentioned operation is repeated. Then, in the case where the control portion 40 judges that no overshooting occurs in the step 103, the position correcting operation is completed.

Subsequently, the operation of the ultrasonic motor in accordance with the embodiment of the present invention will be described in more detail with reference to FIGS. 5A and 5B showing the states of the inverter 11, the buffer 12a and the buffer 12b.

In the case where the moving body 24 that functions as the rotor overshoots during the clockwise rotation, the states of the inverter 11, the buffer 12a and the buffer 12b change as shown in FIG. 5A. That is, when the moving body 24 that functions as the rotor rotates clockwise, the control portion 40 gives the control signals of on, on, and off to the respective control terminals of the inverter 11, the buffer 12a and the buffer 12b. For that reason, the inverter 11 becomes an enable state, the buffer 12a becomes an enable state and the buffer 12b becomes a disable state. Therefore, the high frequency voltage from the oscillation drive circuit 10 is supplied to the piezoelectric body 22 from the electrode 21a and the common electrode 21c, and the moving body 24 that functions as the rotor rotates clockwise.

In this situation, the control portion 40 generates the stop command signal (102) immediately when the moving body 24 that functions as the rotor reaches the desired position (101), and gives the control signal of off to the control terminal of the inverter 11. Upon this, the inverter 11 changes over to a disable state, the control portion 40 stops the supply of the high frequency voltage to the piezoelectric body 22 from the oscillation drive circuit 10. Even if the supply of the high frequency voltage to the piezoelectric body 22 stops, the moving body 24 that functions as the rotor completely stops after the moving body 24 has slightly rotationally moved clockwise due to the residual vibration and inertia. The amount of this slight rotational movement is the maximum at the time of an initial overshooting and becomes smaller at the time of subsequent overshooting caused by reverse operation, and continues to decrease every time this operation is repeated until it is finally converged on the desired-position and the moving body 24 becomes in the stabilized state.

Subsequent to the step 102, the control portion 40 checks whether the position of the moving body 24 is over the desired position, or not (103), and in the case where the control portion 40 judges that overshooting occurs, the control portion 40 retains the stop command signal as it is for the stop command retaining time t (104).

After the moving body 24 that functions as the rotor is over the desired position and slightly rotates clockwise due to the residual vibration and inertia, the moving body 24 completely stops. After a short time, the stop command retaining time t elapses. The control portion 40 generates a forward/backward change-over command signal in an arbitrary time within the stop command retaining time, and gives the off and on signals to the respective control terminals of the buffer 12a and the buffer 12b. Then, the buffer 12a changes over to the disable state and the buffer 12b changes over to the enable state, respectively. Therefore, the control portion 40 generates a stop command release signal as soon as the stop command retaining time t is reached (104) and gives the on control signal to the control terminal of the inverter 11. Then, the inverter 11 changes over to the enable state, and the supply of the high frequency voltage to the piezoelectric body 22 from the oscillation drive circuit 10 restarts, and the moving body 24 that functions as the rotor is reversed counterclockwise (105).

Next, in the case where the moving body 24 that functions as the rotor overshoots during the counterclockwise rotation, the states of the inverter 11, the buffer 12a and the buffer 12b change as shown in FIG. 5B. That is, when the moving body 24 that functions as the rotor rotates clockwise, the control portion 40 gives the control signals of on, off, and on to the respective control terminals of the inverter 11, the buffer 12a and the buffer 12b. For that reason, the inverter 11 becomes an enable state, the buffer 12a becomes a disable state and the buffer 12b becomes an enable state. The high frequency voltage from the oscillation drive circuit 10 is supplied to the piezoelectric body 22 from the electrode 21b, and the moving body 24 that functions as the rotor rotates counter-clockwise.

In this situation, the control portion 40 generates the stop command signal (102) immediately when the moving body 24 that functions as the rotor reaches the desired position (101), and gives the control signal of off to the control terminal of the inverter 11. Upon this, the inverter 11 changes over to a disable state, the control portion 40 stops the supply of the high frequency voltage to the piezoelectric body 22 from the oscillation drive circuit 10. Even if the supply of the high frequency voltage to the piezoelectric body 22 stops, the moving body 24 that functions as the rotor completely stops after the moving body 24 has slightly rotationally moved clockwise due to the residual vibration and inertia.

Subsequent to the step S102, the control portion 40 checks whether the position of the moving body 24 is over the desired position, or not (103), and in the case where the control portion 40 judges that overshooting occurs, the control portion 40 retains the stop command signal as it is for the stop command retaining time t (104).

After the moving body 24 that functions as the rotor is over the desired position and slightly rotates clockwise due to the residual vibration and inertia, the moving body 24 completely stops. After a short time, the stop command retaining time t elapses. The control portion 40 generates a forward/backward change-over command signal in an arbitrary time within the stop command retaining time, and gives the on and off signals to the respective control terminals of the buffer 12a and the buffer 12b. Then, the buffer 12a changes over to the enable state and the buffer 12b changes over to the disable state, respectively. Therefore, the control portion 40 generates a stop command release signal as soon as the stop command retaining time t is reached (104) and gives the on control signal to the control terminal of the inverter 11. Then, the inverter 11 changes over to the enable state, and the supply of the high frequency voltage to the piezoelectric body 22 from the oscillation drive circuit 10 restarts, and the moving body 24 that functions as the rotor is reversed clockwise (105).

The features of the operation of the ultrasonic motor according to the embodiment of the present invention as described above will become apparent from the timing charts shown in FIG. 6. That is, referring to FIG. 6, an uppermost waveform shown (A) represents the results obtained by judging whether the present position of the moving body 24 coincides with a desired value, or not by the control portion 40, a second waveform from the upper shown in (B) represents the results obtained by judging whether the present position of the moving body 24 is over the desired value, or not, by the control portion 40. Also, a third waveform from the upper shown in (C) represents the on/off control signals given to the inverter 11 by the control portion 40, a fourth waveform from the upper shown in (D) represents the on/off control signals given to the buffer 12a by the control portion 40, and a lowermost waveform shown in (E) represents the on/off control signals given to the buffer 12b by the control portion 40, respectively.

The timing charts shown in FIG. 6 represent that reverse operation is conducted from clockwise to counterclockwise after the stop command retaining time of a time interval t1 has elapsed since an instant when the control portion 40 detects an initial coincidence, and subsequently reverse operation is conducted from counterclockwise to clockwise after the stop command retaining time of a time interval t2 has elapsed since an instant when the control portion 40 detects a second coincidence. Then, the stop command is issued at an instant when the control portion 40 detects a third coincidence, and the position signal continues to be issued even if the time exceeds a given stop command retaining time. Therefore, FIG. 6 shows that the ultrasonic motor is in the stabilized state from the instant when the control portion 40 detects the third coincidence.

As shown in FIG. 6, a plurality of stop command retaining times t1 and t2 are set; t2 is set so as to be shorter than t1 in time interval. This is because attention is paid to a fact that the second overshooting is shorter than the first overshooting. The stop command retaining time is a time interval which is from the time the control portion 40 detects that the moving body reaches the desired position and issues the stop command until the time the control portion 40 issues the stop release command, that is, the start command. Specifically, the stop command retaining time is set to be substantially equal to a time interval which is a time until the moving body 24 stops or a time interval which is a time until the vibration of the vibrator 23 stops. In view of this fact, t2 is set to be shorter than t1 in time interval.

As is apparent from FIG. 6, in the present invention, the stop command retaining time includes a plurality of stop command period of times that are different in time interval from each other. Also, the time interval is set to be shorter as the amount of movement of the moving body 24 to the desired position is smaller. In addition, the stop command retaining time is set to be shorter in time interval as the speed of the moving body immediately before the stop command is inputted is slower. If the oscillation drive circuit 10 constitutes the self-excitation oscillating circuit, the stop command retaining time is set to be longer than the time interval which is from the time the stop command is inputted from the control portion 40 until the time the self-excitation vibration of the self-excitation oscillating circuit stops.

As described above, the stop command retaining time is determined in accordance with the state of the position control or the position correction control, and its specific value is experientially determined to several ms to several hundred µs units. Then, the stop command retaining time thus determined is set in the control portion 40 in advance. For example, in the control portion 40 which is made up of a CPU, a ROM, a RAM and so on, the stop command retaining time is stored in the RAM by the input means.

Figure 7A:
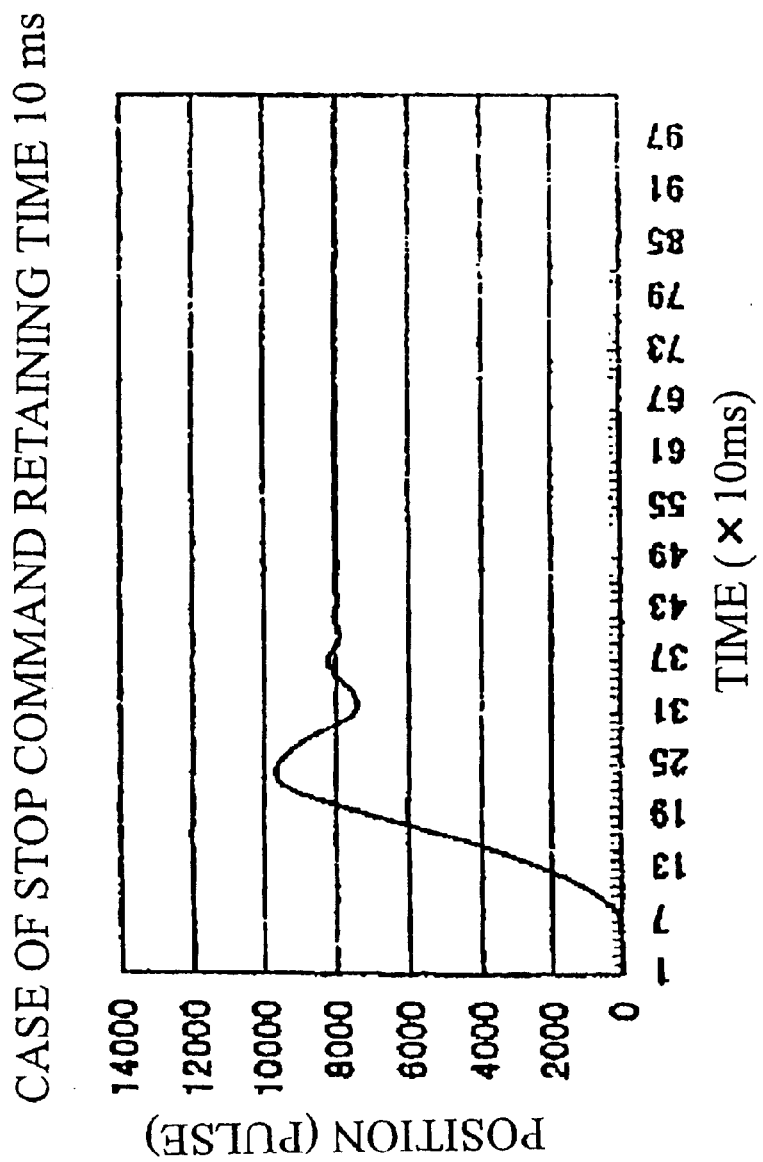
Figure 7B:
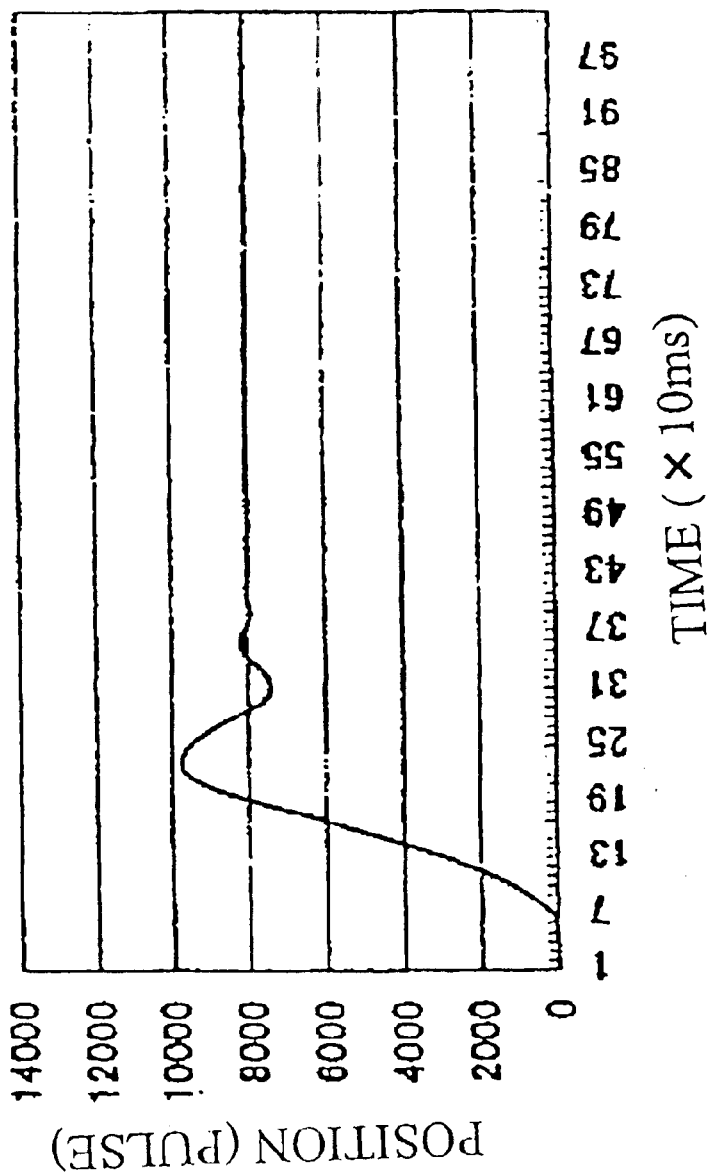
Figure 7C:
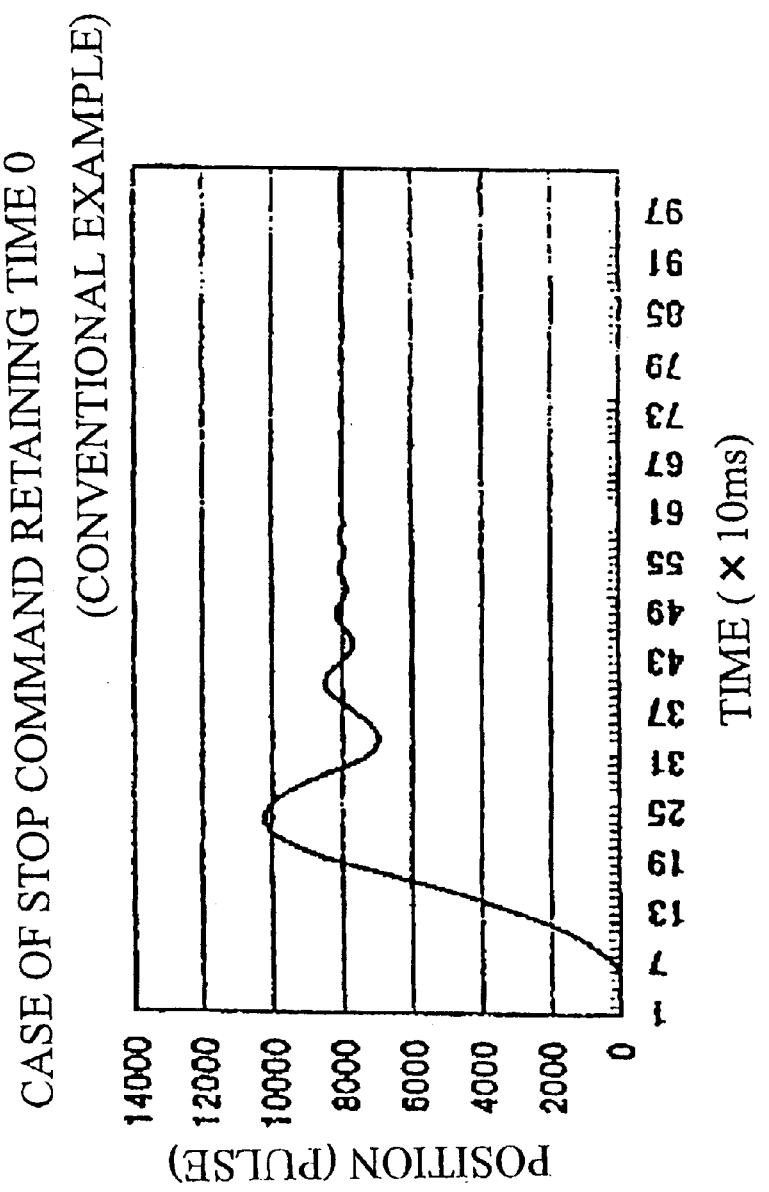

According to the above-mentioned position control of the ultrasonic motor of the present invention, overshooting amount becomes small, and the stabilization time is remarkably shortened. This fact is apparent from FIGS. 7A to 7C. FIGS. 7A to 7C are characteristic graphs showing the position control of the ultrasonic motor, in which FIG. 7A shows the case where the stop command retaining time is 10 ms, FIG. 7B shows the case where the stop command retaining time is 1 ms, and FIG. 7C shows the conventional case where there is no stop command retaining time. The axis of abscissa is position indicated by the number of pulses and the axis of ordinate is a time (×10 ms).

In other words, according to the position control of the ultrasonic motor of the present invention, the maximum overshooting amount is about 1800 pulses in the case where the stop command retaining time is 10 ms as shown in FIG. 7A, and about 1900 pulses in the case where the stop command retaining time is 1 ms as shown in FIG. 7B. On the contrary, according to the conventional position control of the ultrasonic motor, that is, in the case where the stop command retaining time is zero as shown in FIG. 7C, the maximum overshooting amount is about 2100 pulses. Also, according to the position control of the ultrasonic motor of the present invention, the stabilization time is about 490 ms in the case where the stop command retaining time is 10 ms as shown in FIG. 7A, and about 430 ms in the case where the stop command retaining time is 1 ms as shown in FIG. 7B. On the contrary, according to the conventional position control of the ultrasonic motor, that is, in the case where the stop command retaining time is zero as shown in FIG. 7C, the stabilization time is about 610 ms. As described above, according to the position control of the ultrasonic motor of the present invention, the maximum overshooting amount becomes small, and the stabilization time is remarkably shortened. Then, since the stabilization time can be remarkably shortened, the present invention can enhance the positioning resolution as compared with the conventional one.

The ultrasonic motor according to the present invention characterized in that the stop command retaining time is provided to conduct reverse driving was described above in detail. Now, the concept that characterizes the present invention, that is, the background of the concept that the stop command retaining time is provided will be described. The ultrasonic motor is designed so that the moving body is rotationally driven clockwise or counterclockwise due to the vibrations of the vibrator, and the vibrator is driven by the oscillation drive circuit. In order to stop the moving body that is rotationally moving, the vibration of the oscillation drive circuit is stopped by issuing the stop command. The vibration of the oscillation drive circuit does not immediately stop even if a power supply turns off, and it is continued for an extremely short period of time. Also, the vibrator continues the vibration in an extremely short period of time even if the oscillation drive circuit stops. Even if the power supply of the oscillation drive circuit turns off, the vibrations are propagated onto the moving body due to the above-mentioned residual oscillation and residual vibration. In addition, a frictional force is exerted between the moving body and the vibrator by pressurizing the moving body toward the vibrator by the pressurizing means, but even if the power supply of the oscillation drive circuit turns off, the moving body continues the movement for an extremely short period of time due to inertia. In short, the moving body continues to move for an extremely short period of time due to the residual vibration and inertia even if the stop command is issued. For this reason, when the moving body is going to be immediately reversed every time overshooting occurs, there occurs such a phenomenon that the moving body slips. Moreover, there is found such a phenomenon that the residual vibration during forward rotation and the drive vibration during backward rotation are superimposed on each other, and the frictional force between the moving body and the vibrator is remarkably lowered.

Under the above circumstances, a creative idea is produced that the moving body is reversed after waiting for elimination of the above-mentioned phenomenon. Therefore, the stop command retaining time is set to be substantially the same as the time interval which is from the time the control portion detects that the moving body reaches the desired position and issues the stop command until the time the moving body stops, or substantially the same as the time interval which is from the time the control portion detects that the moving body reaches the desired position and issues the stop command until the time the vibrations of the vibrator stop. Then, in the case where the oscillation drive circuit constitutes the self-excitation oscillating circuit, the stop command retaining time is set to be equal to or longer than the time interval which is from the time the control portion detects that the moving body reaches the desired position and issues the stop command until the time the self-excitation oscillation of the self-excitation oscillating circuit stops.

The present invention is applied not only to the standing wave type ultrasonic motor, but is also applicable to the progressive wave type ultrasonic motor or the like. Also, the oscillation drive circuit 10 is not limited to the self-excitation oscillating circuit but may be a separately excited oscillating circuit.

According to the present invention, in an ultrasonic motor which is feedback-controlled so that the position of the moving body becomes a desired position by the control portion while the position signal from the position sensor is compared with the desired position that has been inputted in advance, or an electronic device using the ultrasonic motor as the positioning means, the reverse operation is conducted after a stop command retaining time has elapsed since the instant of overshooting, and the overshooting becomes very small as compared with the conventional position control of the ultrasonic motor, and the stabilization time is remarkably shortened. Therefore, the positioning resolution is enhanced, and the lifetime of the ultrasonic motor is lengthened.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An ultrasonic motor comprising:
   a vibrator to which a piezoelectric body is attached;
   a moving body that is arranged so as to rotate clockwise or counterclockwise due to the vibration of said vibrator;
   a pressurizing means that brings said moving body in pressure contact with said vibrator;
   an electrode that applies a high frequency voltage to said piezoelectric body;
   an oscillation drive circuit that generates the high frequency voltage;
   a position sensor that generates a position signal of said moving body; and
   a control portion that gives a command signal to said oscillation drive circuit and controls the supply of the high frequency voltage to said piezoelectric body to start/stop and rotate forward or backward the motor, in which feedback control is performed by said control portion so that the position of said moving body reaches a desired position while the position signal is compared with the desired position that is inputted in advance,
   wherein reverse operation is conducted after a stop command retaining time is elapsed since an instant of overshooting.

2. An ultrasonic motor according to claim 1, wherein the stop command retaining time is set in said control portion in advance and is a time interval which is from a time said control portion detects that said moving body reaches the desired position and issues a stop command until a time said control portion issues a start command.

3. An ultrasonic motor according to claim 1, wherein the stop command retaining time is substantially the same as a time interval which is from a time said control portion detects that said moving body reaches the desired position and issues a stop command until a time said moving body stops.

4. An ultrasonic motor according to claim 1, wherein the stop command retaining time is substantially the same as a time interval which is from a time said control portion detects that said moving body reaches the desired position and issues a stop command until a time the vibration of said vibrator stops.

5. An ultrasonic motor according to claim 1, wherein said oscillation drive circuit constitutes a self-excitation oscillating circuit, and the stop command retaining time is substantially the same as a time interval which is from a time said control portion detects that said moving body reaches the desired position and issues a stop command until a time the self-excitation oscillation of the self-excitation oscillating circuit stops.

6. An ultrasonic motor according to claim 1, wherein said stop command retaining time includes a plurality of stop command retaining times that are different in time interval.

7. An ultrasonic motor according to claim 1, wherein the stop command retaining time is set to be shorter in time interval as the amount of movement of said moving body to the desired position is smaller.

8. An ultrasonic motor according to claim 1, wherein the stop command retaining time is set to be shorter as the speed of said moving body immediately before said control portion issues the stop command is slower.

9. An electronic device including the ultrasonic motor as set forth in claim 1.

* * * * *